(12) United States Patent
Kim et al.

(10) Patent No.: US 12,347,862 B2
(45) Date of Patent: Jul. 1, 2025

(54) ANODE SLURRY COMPOSITION

(71) Applicant: LG CHEM, LTD., Seoul (KR)

(72) Inventors: Kyung Oh Kim, Daejeon (KR); Jeong Ae Yoon, Daejeon (KR); Su Jee Kwon, Daejeon (KR); Sung Soo Yoon, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 1267 days.

(21) Appl. No.: 16/969,374

(22) PCT Filed: Apr. 22, 2019

(86) PCT No.: PCT/KR2019/004799
§ 371 (c)(1),
(2) Date: Aug. 12, 2020

(87) PCT Pub. No.: WO2020/022613
PCT Pub. Date: Jan. 30, 2020

(65) Prior Publication Data
US 2020/0403242 A1 Dec. 24, 2020

(30) Foreign Application Priority Data
Jul. 24, 2018 (KR) ........................ 10-2018-0085772

(51) Int. Cl.
*H01M 4/62* (2006.01)
*H01M 4/02* (2006.01)
(Continued)

(52) U.S. Cl.
CPC ........... *H01M 4/622* (2013.01); *H01M 4/364* (2013.01); *H01M 4/386* (2013.01); *H01M 4/587* (2013.01);
(Continued)

(58) Field of Classification Search
CPC ...... H01M 4/622; H01M 4/364; H01M 4/386; H01M 4/587; H01M 10/0525;
(Continued)

(56) References Cited

U.S. PATENT DOCUMENTS

| 6,395,429 B1 | 5/2002 | Kang et al. |
| 8,137,849 B2 | 3/2012 | Kang et al. |

(Continued)

FOREIGN PATENT DOCUMENTS

| CN | 102959773 A | 3/2013 |
| CN | 104380504 A | 2/2015 |

(Continued)

OTHER PUBLICATIONS

International Search Report (PCT/ISA/210) issued in PCT/KR2019/004799 mailed on Jul. 15, 2019.
(Continued)

*Primary Examiner* — Matthew T Martin
*Assistant Examiner* — Bartholomew A Hornsby
(74) *Attorney, Agent, or Firm* — Birch, Stewart, Kolasch & Birch, LLP

(57) ABSTRACT

An anode slurry composition that can be applied to the production of anodes to cope with shrinkage and expansion by repeated charge and discharge. The anode slurry composition also provides an excellent binding force between active materials and adhesive force to a current collector. An anode and a secondary battery comprising the anode slurry composition are also provided.

16 Claims, 1 Drawing Sheet

(51) Int. Cl.
*H01M 4/36* (2006.01)
*H01M 4/38* (2006.01)
*H01M 4/587* (2010.01)
*H01M 10/0525* (2010.01)

(52) U.S. Cl.
CPC .. *H01M 10/0525* (2013.01); *H01M 2004/027* (2013.01)

(58) Field of Classification Search
CPC ......... H01M 2004/027; H01M 4/0404; H01M 4/1395; H01M 4/134
See application file for complete search history.

(56) References Cited

U.S. PATENT DOCUMENTS

| | | | |
|---|---|---|---|
| 9,413,011 B2 * | 8/2016 | Kang | H01M 4/133 |
| 10,109,862 B2 | 10/2018 | Ahn et al. | |
| 2012/0010136 A1 | 1/2012 | Caligiuri et al. | |
| 2012/0183848 A1 | 7/2012 | Kang et al. | |
| 2013/0122364 A1 * | 5/2013 | Kim | H01M 4/621 |
| | | | 429/211 |
| 2013/0216906 A1 * | 8/2013 | Kang | H01M 4/131 |
| | | | 526/287 |
| 2014/0178756 A1 * | 6/2014 | Ishii | H01M 4/13 |
| | | | 429/211 |
| 2015/0079467 A1 | 3/2015 | Ahn et al. | |
| 2016/0204465 A1 | 7/2016 | Mimura et al. | |
| 2017/0040612 A1 * | 2/2017 | Komaba | C08F 220/06 |
| 2017/0062828 A1 * | 3/2017 | Sonobe | H01M 10/0525 |
| 2018/0316020 A1 * | 11/2018 | Pfleging | H01M 10/0525 |

FOREIGN PATENT DOCUMENTS

| | | |
|---|---|---|
| CN | 104396059 A | 3/2015 |
| CN | 104471762 A | 3/2015 |
| CN | 108233514 A | 12/2016 |
| JP | 2013-8667 A | 1/2013 |
| JP | 2015-518284 A | 6/2015 |
| JP | 2016-171074 A | 9/2016 |
| JP | 6048070 B2 | 12/2016 |
| KR | 10-2001-0004121 A | 1/2001 |
| KR | 10-0744835 B1 | 8/2007 |
| KR | 10-2012-0010136 A | 2/2012 |
| KR | 10-2016-0046882 A | 4/2016 |
| KR | 10-1617408 B1 | 5/2016 |
| WO | WO 2013/191239 A | 12/2013 |
| WO | WO 2017/150048 A1 | 9/2017 |

OTHER PUBLICATIONS

Extended European Search Report for European Application No. 19842328.7, dated Feb. 26, 2021.

* cited by examiner

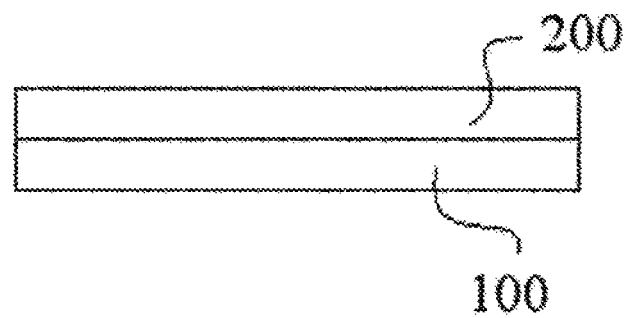

ANODE SLURRY COMPOSITION

TECHNICAL FIELD

This application claims the benefit of priority based on Korean Patent Application No. 10-2018-0085772 filed on Jul. 24, 2018, the disclosure of which is incorporated herein by reference in its entirety.

The present application relates to an anode slurry composition.

BACKGROUND ART

Secondary batteries such as lithium ion secondary batteries have been used variously as they can be manufactured to be lightweight while being compact, have a high energy density and can be repeatedly charged and discharged.

Various studies have been made to improve the performance of the secondary battery. For example, there has been an attempt to use a silicon anode active material as an anode active material in order to increase the capacity. However, the silicon series active material had a high theoretical capacity, but it repeatedly expanded and shrank largely during charging and discharging, whereby there was a problem that the active material deteriorated over time, the electrode plate structure was destroyed and the conductive path in the electrode was damaged.

DISCLOSURE

Technical Problem

The present application relates to an anode slurry composition. The present application can provide an anode slurry composition which can be applied to production of anodes to cope well with shrinkage and expansion by repeated charge and discharge, and has excellent binding force between active materials and adhesive force to a current collector.

Technical Solution

The present application relates to an anode slurry composition. The anode slurry composition means a composition used for manufacturing an anode.

The anode slurry composition of the present application comprises an anode active material and an acrylic polymer.

In one example, the acrylic polymer may be a copolymer. The copolymer may be a block copolymer, a gradient copolymer or a random copolymer, and in one example, it may be a random copolymer.

By using an anode slurry composition comprising an acrylic copolymer having a monomer composition to be described below, the present application can effectively cope with repeated shrinkage and expansion according to charge and discharge of a secondary battery, and secure binding force between active materials and excellent adhesive force to a current collector.

The term acrylic copolymer is a copolymer containing an acrylic monomer unit as a main component. Also, the fact of being included as a main component is a case where the weight ratio of the relevant component is about 55 wt % or more, 60 wt % or more, 65 wt % or more, 70 wt % or more, 75 wt % or more, 80 wt % or more, 85 wt % or more, or about 90 wt % or more, based on the total weight. Here, the upper limit of the ratio of the main component is not particularly limited, which may be about 100 wt % or so.

In addition, the term acrylic monomer means acrylic acid, methacrylic acid or a derivative thereof, such as an acrylic acid ester or a methacrylic acid ester.

As one example, the acrylic polymer may comprise a carboxylic acid-containing monomer unit, a hydroxyl group-containing monomer unit and a monomer unit with an unshared electron pair.

The term monomer unit means a state where the relevant monomer forms a main chain or side chain of a polymer through a polymerization reaction.

As the carboxylic acid-containing monomer unit, a known component can be used without particular limitation, and for example, (meth)acrylic acid, 2-(meth)acryloyloxyacetic acid, 3-(meth)acryloyloxypropylic acid, 4-(meth)acryloyloxybutyric acid, itaconic acid, maleic acid and maleic anhydride, and the like can be used, without being limited thereto. In one example, acrylic acid can be applied.

The carboxylic acid-containing monomer unit is not particularly limited as it can be selected in consideration of the desired acrylic polymer stiffness and the like. In one example, the carboxylic acid-containing monomer unit may be included in a ratio in a range of about 60 parts by weight to about 90 parts by weight relative to 100 parts by weight of the acrylic polymer. In another example, the ratio of the carboxylic acid-containing monomer unit may be about 60 parts by weight or more, about 65 parts by weight or more, or about 70 parts by weight or more, or may be about 85 parts by weight or less, or about 80 parts by weight or less, relative to 100 parts by weight of the acrylic polymer.

The hydroxyl group-containing monomer unit may be a known component without any particular limitation, and for example, a monomer represented by the following formula 1 may be used.

[Formula 1]

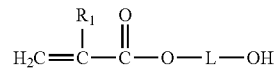

In Formula 1 above, $R_1$ is hydrogen or an alkyl group having 1 to 4 carbon atoms, and L represents alkylene with 1 to 10 carbon atoms un-substituted or substituted with an alkyl group having 1 to 4 carbon atoms or a hydroxyl group,

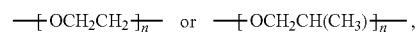

where n is an integer of 1 to 20.

The monomer represented by Formula 1 above can be exemplified by 2-hydroxyethyl (meth)acrylate, 2-hydroxypropyl (meth)acrylate, 4-hydroxybutyl (meth)acrylate, 6-hydroxyhexyl (meth)acrylate, 8-hydroxyoctyl (meth)acrylate, 2-hydroxyethylene glycol (meth)acrylate or 2-hydroxypropylene glycol (meth)acrylate, and the like, but is not limited thereto.

The hydroxyl group-containing monomer unit is not particularly limited as it can be controlled in consideration of the desired acrylic polymer elasticity and the like. In one example, the hydroxy-containing monomer unit may be included in a ratio in a range of about 5 parts by weight to about 35 parts by weight relative to 100 parts by weight of the acrylic polymer. As another example, it may be about 8 parts by weight or more, 10 parts by weight or more, or about 15 parts by weight or more, and may be about 30 parts by weight or less, or about 25 parts by weight or less, relative to 100 parts by weight of the acrylic polymer.

The monomer unit having an unshared electron pair may be a known component without any particular limitation, and for example, a monomer represented by the following formula 2 may be used.

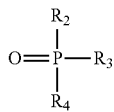
[Formula 2]

In Formula 2 above, $R_2$ to $R_4$ are each independently a hydroxyl group or an ethylenic functional group, and at least one of $R_2$ to $R_4$ is an ethylenic functional group, where the ethylenic functional group is represented by —X—Y—Z, X is an oxygen atom or a single bond, Y is a single bond, or alkylene with 1 to 4 carbon atoms un-substituted or substituted with an alkyl group having 1 to 10 carbon atoms or an aryl group having 4 to 12 ring members, and Z is a (meth)acrylate group, an allyl group or a vinyl group.

In X or Y of Formula 2, the single bond means a case where atomic groups on both sides are directly bonded without mediating a separate atom.

The monomer represented by Formula 2 above can be exemplified by, for example, (meth)acryloxyethyl phosphate, (meth)acryloxypropyl phosphate, monomethyl-2-methacryloyloxyethyl phosphate, dibutyl-2-methacryloyloxyethyl phosphate, dioctyl-2-methacryloyloxyethyl phosphate, diphenyl-2-methacryloyloxyethyl phosphate, allyl phosphate, vinyl phosphate, bis(methacryloxyethyl) phosphate, allyl phosphoric acid or vinyl phosphoric acid, and the like, but is not limited thereto.

The monomer unit having the unshared electron pair may be included in a ratio in a range of about 1 part by weight to about 10 parts by weight relative to 100 parts by weight of the acrylic polymer. As another example, it may be about 2 parts by weight or more, 3 parts by weight or more, or about 4 parts by weight or more, and may be about 9 parts by weight or less, 8 parts by weight or less, or about 7 parts by weight or less, relative to 100 parts by weight of the acrylic polymer. By using the monomer unit having the unshared electron pair, the binding force between the active materials and the adhesive force to the current collector can be improved.

As the acrylic polymer contained in the anode slurry composition comprises a carboxylic acid-containing monomer unit, a hydroxyl group-containing monomer unit and a monomer unit having an unshared electron pair that satisfy the parts by weight in the above ranges, the binding force between the active materials and the adhesive force to the current collector can be more improved.

As one example, the acrylic polymer may have a solubility of about 5% or less in a non-aqueous solvent, which is described below, constituting a secondary battery at room temperature, for example, at any temperature of about 10° C. to about 30° C., as one embodiment, at about 25° C. On the other hand, the solubility can be measured according to the method disclosed in examples.

In the present application, the non-aqueous solvent may mean a solvent that can be used as an electrolyte in a secondary battery. It is not particularly limited as long as it is a non-aqueous solvent serving as a medium through which ions involved in the electrochemical reaction of the battery can move, which can be used as the electrolyte. Specifically, a carbonate-based, ester-based, ether-based, ketone-based alcohol-based or aprotic solvent may be used as the electrolyte.

As the carbonate-based solvent, dimethyl carbonate (DMC), diethyl carbonate (DEC), dipropyl carbonate (DPC), methyl propyl carbonate (MPC), ethyl propyl carbonate (EPC), methyl ethyl carbonate (MFC) ethylene carbonate (EC), propylene carbonate (PC) or butylene carbonate (BC), and the like can be used. As the ester-based solvent, methyl acetate, ethyl acetate, n-propyl acetate, 1,1-dimethyl ethyl acetate, methyl propionate, ethyl propionate, γ-butyrolactone, decanolide, valerolactone, mevalonolactone or carprolactone, and the like can be used. As the ether-based solvent, diethyl ether, dipropyl ether, dibutyl ether, dimethoxymethane, trimethoxymethane, dimethoxyethane, diethoxyethane, diglyme, triglyme, tetraglyme, tetrahydrofuran, 2-methyltetrahydrofuran or polyethylene glycol dimethyl ether, and the like can be used. As the ketone-based solvent, cyclohexanone and the like can be used. As the alcohol-based solvent, ethyl alcohol or isopropyl alcohol, and the like can be used. As the aprotic solvent, nitriles such as acetonitrile, amides such as dimethylformamide, dioxolanes such as 1,3-dioxolane (DOL) or sulfolane, and the like can be used.

The non-aqueous solvent may be used alone or in a mixture of one or more, and when it is used in a mixture of one or more, the mixing ratio may be appropriately adjusted according to the desired battery performance, and in particular, a mixed solution of 1,3-dioxolane and dimethoxyethane in a volume ratio of 1:1 is preferred.

When the acrylic polymer of the present application has a solubility of 5% or less, preferably, 1% or less in the non-aqueous solvent at 25° C., the anode may have excellent resistance to the non-aqueous solvent to exhibit high cycle stability.

As one example, the acrylic polymer may have a solubility of about 50% or more in a solvent that can be included in an anode slurry composition to be described below, for example, an aqueous solvent, as one embodiment, water. In another example, the solubility in water may be about 55% or more, 60% or more, 65% or more, 70% or more, or about 75% or more, and the upper limit is not specifically limited, but may be about 100% or less, 95% or less, or about 90% or less or so.

When the acrylic polymer satisfies the low solubility in the above range for the non-aqueous solvent and the high solubility in the above range for water, the binding force between the active materials and the adhesive force to the current collector can be improved.

As one example, the acrylic polymer may have a glass transition temperature of a homopolymer, for example, in a range of about −100°C. to about 200° C., and preferably in a range of about −10° C. to about 100° C. The acrylic polymer having a glass transition temperature in the above range can simultaneously realize appropriate stiffness and elasticity.

As one example, the acrylic polymer may have a weight average molecular weight in a range of about 50,000 to about 5,000,000. In the present application, the term weight average molecular weight may mean a converted value relative to standard polyethylene glycol as measured by GPC (gel permeation chromatograph), and unless otherwise specified, the molecular weight of any polymer may mean the weight average molecular weight of the polymer. In another example, the weight average molecular weight may be about 100,000 or more, or about 200,000 or more, or may be about 4,500,000 or less, 4,000,000 or less, 3,500,000 or less, or about 3,000,000 or less or so.

When the weight average molecular weight of the acrylic polymer is less than 50,000, the adhesive force is reduced, so that the anode active layer and the current collector may be peeled off, and when it is more than 5,000,000, the viscosity is quite high, so that slurry mixing can be difficult upon anode manufacturing.

The acrylic polymer may have a molecular weight distribution (PDI; Mw/Mn) that is, a ratio (Mw/Mn) of a weight average molecular weight (Mw) to a number average molecular weight (Mn) in a range of about 2 to about 10 or so.

Such an acrylic polymer may be prepared on the basis of a general method for producing a copolymer known in the art.

For example, the acrylic polymer may be prepared by applying a mixture of the monomer units as described above to a method such as solution polymerization, bulk polymerization, suspension polymerization or emulsion polymerization, but may be advantageously prepared by solution polymerization as appropriate. The method of preparing the polymer through solution polymerization is not particularly limited. On the other hand, the solvent for solution polymerization is not particularly limited, but it is preferably a solvent having a boiling point of 110° C. or lower for using the polymer solution itself without additional purification processes after the solution polymerization. As one example, the polymerization solvent may include acetone, methanol, ethanol, acetonitrile, isopropanol or water, and the like, and water is preferable considering environmental influences and the boiling point.

The anode slurry composition may further comprise other components.

For example, the anode shin composition may comprise a cross-linking component capable of cross-linking the acrylic polymer. Such a cross-linking component can be selected, for example, so as to form a cross-linking structure that the acrylic polymer can adequately represent the desired physical properties.

Here, the kind of the applied cross-linking component is not particularly limited, which can be selected according to a known method.

For example, when the polymer contains a cross-linkable functional group such as a hydroxyl group, a urethane cross-linking method applying a cross-linking agent such as an isocyanate cross-linking agent may be applied. At this time, the cross-linking agent may be exemplified by a diisocyanate compound such as tolylene diisocyanate, xylene diisocyanate, diphenylmethane diisocyanate, hexamethylene diisocyanate, isophorone diisocyanate, tetramethylxylene diisocyanate or naphthalene diisocyanate; or a compound obtained by reacting the diisocyanate compound with a polyol (e.g., trimethylolpropane); and the like. Alternatively, after some or all of the hydroxyl groups are transformed to radical reactive groups such as (meth)acryloyl groups by applying a material such as isocyanatoalkyl (meth)acrylate, a method of implementing a cross-linked structure through a radical reaction or the like can be used.

Such a cross-linked structure can be imparted so that appropriate elasticity can be imparted to the acrylic polymer by ensuring an appropriate cross-linking degree. For example, the cross-linking degree can be imparted such that the gel fraction calculated by the distilled water extraction residue fraction is in a range of about 10% to about 30%. Such a cross-linking degree (gel fraction) can be achieved by adjusting the type or ratio of the cross-linking agent to be applied, the kind or ratio of the cross-linking functional group, or the cross-linking conditions.

The gel fraction can be specifically determined according to Equation 1 below.

$$\text{Gel fraction (\%)} = B/A \times 100 \qquad \text{[Equation 1]}$$

In Equation 1, A is the mass of the acrylic polymer, and B represents the dry mass of the insoluble contents collected after the acrylic polymer having the mass A in a state of being placed in a net having, a size of 200 meshes is immersed in distilled water at room temperature for 72 hours.

A slurry composition suitable for the purpose of the present application can be realized by maintaining the gel fraction in the above range.

In Equation 1 above, the room temperature is a natural temperature without warming or cooling, and for example, is any one temperature in a range of about 10° C. to about 30° C., or a temperature of about 23° C. or about 25° C. or so. On the other hand, in Equation 1 above, the 72 hours may be, for example, 71 hours to 73 hours, which includes an equivalent range.

Also, in Equation 1 above, the dry mass means a state where the collected insoluble contents are subjected to a proper drying process so that the relevant insoluble contents do not substantially contain a solvent (ethyl acetate, etc.), and for example, means a state where the amount of the solvent is about 1 wt % or less, 0.5 wt % or less, 0.1 wt % or less, or about 0.05 wt % or less. The drying condition to be applied for this purpose is not particularly limited, which can be adjusted so that the solvent amount as above can be achieved.

An anode active material contained in the anode slurry composition of the present application is, for example, a material capable of transferring electrons from the anode of a lithium secondary battery. As the anode active material of the lithium ion secondary battery, a material capable of absorbing and desorbing lithium is generally used. The anode slurry composition of the present application comprises at least a silicon active material as the anode active material.

The silicon anode active material may include silicon (Si), an alloy containing silicon, SiO, $SiO_2$, SiOx, a composite material of a Si-containing material with conductive carbon formed by coating or compounding the Si-containing material with the conductive carbon, and the like. These silicon anode active materials may be used alone or in combination of two types.

Here, the alloy containing silicon can be exemplified by, for example, an alloy composition comprising at least one element selected from the group consisting of titanium, iron, cobalt, nickel and copper, and silicon. In addition, as the alloy containing silicon, for example, an alloy composition containing silicon, aluminum and a transition metal such as iron, or silicon, tin and a rare earth element such as yttrium can also be used.

SiOx may be a compound containing Si and at least one of SiO and $SiO_2$, wherein x is generally in a range of 0.01 or more to less than 2. SiOx can be formed, for example, by using a disproportionation reaction of SiO. Specifically, SiOx can be prepared by heat-treating SiO in the presence of a polymer such as polyvinyl alcohol optionally to produce silicon and silicon dioxide. The heat treatment may be performed at a temperature of, for example, about 900° C. or higher or about 1000° C. or higher under an atmosphere containing organic gas and/or vapor after the SiO and the polymer are pulverized and mixed.

The composite material of the Si-containing material and the conductive carbon comprises, for example, a compound obtained by heat-treating a pulverized mixture of SiO and a polymer such as polyvinyl alcohol with optionally a carbon material under an atmosphere containing organic gas and/or vapor. Furthermore, the composite material may also be obtained by a known method such as a method of coating the surface of SiO particles with a chemical vapor deposition method using organic gas or the like or a method of performing composite atomization (granulation) of SiO particles and graphite or artificial graphite with a mechano-chemical method.

From the viewpoint of high capacity, the above-described silicon-containing alloy and SiOx can be used as the silicon anode active material.

Also, in the composition, as the active material, the silicon material and other known carbon anode active materials and/or metal anode active materials, and the like may be used in combination. As one example, the carbon anode active material can be exemplified by amorphous carbon, graphite, natural graphite, mesocarbon microbeads or pitch-based carbon fibers, and the like, but is not limited thereto. As one example, the metal anode active material may include lithium metal or an alloy containing lithium, and the like. Here, the alloy containing lithium can be exemplified by, for example, an alloy composition comprising at least one element selected from the group consisting of Ag, Ba, Bi, Cu, Ga, Ge, In, Ni, P, Pb, Sb, Si, Sn, Sr, Zn and Ti, and lithium, but is not limited thereto.

The anode active material may be contained, for example, in a ratio of about 70 parts by weight to about 99 parts by weight, relative to 100 parts by weight of the total solid content in the anode slurry composition. As another example, it may be about 75 parts by weight or more, 80 parts by weight or more, or about 85 parts by weight or more, and may be about 98 parts by weight or less, 97 parts by weight or less, or about 96 parts by weight or less, relative to 100 parts by weight of the total solid content in the anode slurry composition.

In the present application, the solid content of the anode slurry composition is a state where a solvent, which is described below, such as an organic solvent or an aqueous solvent is not substantially included, and for example, a case where the ratio of the solvent is 5 wt % or less, 4 or less, 3 wt % or less, 2 wt % or less, 1 wt % or less, or 0.5 wt % or less, or 0 wt %.

As one example, the anode active material may be an active material mixture in which a silicon active material and a carbon active material are mixed, and the silicon active material may be contained in a ratio in a range of about 99 wt % or less relative to 100 wt % of the entire anode active material. As another example, the ratio of the silicon active material may be about 90 wt % or less, 80 wt % or less, 70 wt % or less, 60 wt % or less, 50 wt % or less, 40 wt % or less, 30 wt % or less, 20 wt % or less, or 10 wt % or less, and may be about 0.1 wt % or more, 0.5 wt % or more 1.0 wt % or more, 2 wt % or more, 3 wt % or more, 4 wt % or more, or about 5 wt % or more. By using the active material mixture in the above range, the expansion and shrinkage of the anode active material can be more effectively suppressed, and the cycle characteristics of the lithium ion secondary battery can be further improved.

In one example, the anode slurry composition may comprise a surfactant or thickener in a ratio in a range of about 0.01 parts by weight or less relative to 100 parts by weight of the entire acrylic polymer. As another example, it may be contained in a ratio in a range of about 0.001 parts by weight or less, and preferably it does not include a surfactant or a thickener. When the shiny composition comprising the acrylic polymer of the present application is used, it is also possible to secure excellent binding force between active materials and adhesive force to the current collector without using a surfactant or a thickener.

In one example, the anode slurry composition may further comprise a conductive material. As the conductive material, graphite such as natural graphite or artificial graphite; carbon black such as carbon black, acetylene black, ketchen black, channel black, furnace black, lamp black, or summer black; a conductive fiber such carbon fiber or metal fiber carbon fluoride powder; a metal powder such as an aluminum powder, or a nickel powder; a conductive whisker such as zinc oxide or potassium titanate; a conductive metal oxide such as titanium oxide; a conductive material such as a polyphenylene derivative, etc. can be used, without being limited thereto.

The ratio of the conductive material may be selected in consideration of the desired battery performance or the like, which is not particularly limited, and it may be included, for example, in a ratio in a range of about 0.01 parts by weight to about 20 parts by weight relative to 100 parts by weight of the total solid content of the anode slurry composition. As another example, it may be about 0.02 part by weight or more, 0.05 part by weight or more, 0.1 parts by weight or more, or about 0.5 part by weight or more, and may be about 15 parts by weight or less, 10 parts by weight or less, 8 parts by weight or less, or about 5 parts by weight or less, relative to 100 parts by weight of the total solid content of the anode slurry composition.

In one example, the anode slurry composition may further comprise a particulate binder. In one example, as the particulate binder, a known particulate binder, such as styrene butadiene rubber (SBR), polyvinylidenefluoride (PVDF), styrene-acryl and acrylonitrile-butadiene-styrene (ABS), and the like may be used, without being limited thereto.

The ratio of the particulate binder may be selected in consideration of the desired battery performance and the like, and it may be included in a range of 100 parts by weight to 900 parts by weight relative to 100 parts by weight of the acrylic polymer. As another example, it may be about 150 parts by weight or more, 200 parts by weight or more, 250 parts by weight or more, or about 300 parts by weight or more, or may be about 850 parts by weight or less, 800 parts by weight or less, 750 parts by weight or less, or about 700 parts by weight or less, relative to 100 parts by weight of the acrylic polymer.

By including the particulate binder in the above range, the binding force between the anode active materials can be further improved.

In one example, the anode slurry composition may further comprise a solvent. The kind of the solvent may be suitably set in consideration of the desired performance and the like, which may be a solvent, such as an aqueous solvent such as water, an organic solvent, or a mixed solvent of two or more. In one embodiment, as the solvent, an organic solvent such as N-methyl-2-pyrrolinone, propylene carbonate, ethylene carbonate, butylene carbonate, dimethyl carbonate, diethyl carbonate, gamma-butyrolactone, 1,2-dimethoxyethane, tetrahydrofuran, 2-methyl tetrahydrofuran, dimethylsulfoxide, formamide, dimethylformamide, acetonitrile, nitromethane, methyl formate, methyl acetate, phosphoric acid triester, trimethoxymethane, sulfolane, methyl sulfolane, 1,3-dimethyl-2-imidazolidinone, propylene carbonate derivatives, tetrahydrofuran derivatives, methyl propionate or ethyl propionate, or water may be used, but water is most preferred considering environmental influences. The content of the solvent may be selected in consideration of the desired battery performance and the like, and as one example, the solvent may be included in the anode slurry composition such that the total amount of solid content in the anode slurry composition is about 30 parts by weight to about 60 parts by weight relative to 100 parts by weight of the anode slurry composition. As another example, the content of the solvent may be included in the anode slurry composition such that the total solid content in the anode slurry composition is about 35 parts by weight or more, or 40 parts by weight or more, or is about 55 parts by weight or less, or about 50 parts by weight or less, relative to the anode slurry composition.

The anode slurry composition may comprise other components, for example, a reinforcing material or an electrolyte additive, and the like, in addition to the anode active material, the acrylic polymer, the conductive material, the particulate binder, and the like, as described above.

The anode slurry composition can be prepared bye mixing the respective components in a known manner without any particular limitation.

For example, the anode slurry composition can be prepared by adding an appropriate dispersion medium to the respective components, if necessary, and mixing them, and for example, can be prepared by mixing the respective components using a mixer such as a ball mill, a sand mill, a bead mill, a pigment dispersing machine, an ultrasonic dispersing machine, a homogenizer, a planetary mixer or a fill mix.

The anode slurry composition of the present application may have a maximum particle diameter size of less than about 80 μm. As another example, the maximum particle diameter size of the anode slurry composition may be less than about 79 μm or less than about 78 μm, and may be about 55 μm or more, 57 μm or more, 59 μm or more, or about 61 μm or more. When the maximum particle diameter size of the anode slurry composition satisfies the above range, it is advantageous to improve binding force with a current collector to be described below.

The present application also relates to an anode for a secondary battery, for example, a silicon anode for a secondary battery. The anode can be used, for example, as an anode of a lithium secondary battery.

In one example, the anode is equipped with a current collector and an anode active layer formed on the current collector. The anode active layer is formed by an anode slurry composition. The FIGURE shows a case where an anode active layer (200) is formed on a current collector (100).

The anode can be produced, for example, according to a known method in which the above-mentioned anode slurry composition is applied on a current collector, dried and, if necessary, rolled.

Here, the method for applying the anode slurry composition on the current collector is not particularly limited and known methods can be used. Specifically, as the application method, a doctor blade method, a dipping method, a reverse roll method, a direct roll method, a gravure method, an extrusion method, a brushing method, or the like can be used. Such application may be performed only on one side of the current collector, or may be performed on both sides, and the amount of application is not particularly limited, which may be adjusted within a range that can finally form the desired thickness of the anode active layer.

Here, as the current collector, a material having electric conductivity and electrochemical durability is used. In general, as the cumin collector, for example, iron, copper, aluminum, nickel, stainless steel, titanium, tantalum, gold, copper foil or platinum, and the like is used, and such a material may be used alone or in combination of two or more thereof.

As one example, the anode active layer may have adhesive force with the current collector of about 11 gf/cm or more. The adhesive force of the anode active layer may be about 12 gf/cm or more, and may be about 30 gf/cm or less, 28 gf/cm or less, 26 gf/cm or less, 24 gf/cm or less, 22 gf/cm or less, or about 20 gf/cm or less. When the adhesive force of the anode active layer formed by the anode slurry composition falls within the above range, the anode manufacturing processability can be improved.

As one example, the thickness of the anode active layer can be suitably selected in consideration of the desired performance, which is not particularly limited. For example, the active layer may have a thickness in a range of about 1 μm to 200 μm. As another example, the thickness of the anode active layer may be about 5 μm or more, 10 μm or more, 20 μm or more, 30 μm or more, 40 μm or more, 50 μm or more, 60 μm or more, 70 μm or more, or about 80 μm or more, and may be about 190 μm or less, 180 μm or less, 170 μm or less, 160 μm or less, 150 μm or less, 140 μm or less, 130 μm or less, 120 μm or less, or 110 μm or less. When the thickness of the anode active layer satisfies the above range, high characteristics can be realized in both load characteristics and energy density.

The present application also relates to a secondary battery comprising the anode, for example, a lithium ion secondary battery. The configuration of such a secondary battery is not particularly limited, and it may have a known configuration as long as it comprises the anode. For example, the lithium ion secondary battery may include a cathode, an anode, an electrolyte and a separator.

Specific types of the respective components included in the secondary battery, for example, the cathode, the electrolyte, thee separator, and the like or the method of forming the secondary battery using the same are not particularly limited, and a known method can be applied.

Advantageous Effects

The present application can provide an anode slurry composition which can be applied to production of anodes to cope well with shrinkage and expansion by repeated charge and discharge, and has excellent binding Three between active materials and adhesive force to a current collector, and an anode and a secondary battery, comprising the same.

BRIEF DESCRIPTION OF DRAWING

The FIGURE is an exemplary schematic diagram of an anode of the present application.

MODE FOR INVENTION

Hereinafter, the present application will be specifically described by way of examples, but the scope of the present application is not limited by the following examples.

1. Evaluation of Molecular Weight

The weight average molecular weight (Mw) and the molecular weight distribution (PDI) were measured using GPC (gel permeation chromatograph) under the following conditions, and the measurement results were converted using standard polyethylene glycol of Agilent system for production of calibration curves.

<Measurement Conditions>
Measuring instrument: Agilent GPC (Agilent 1200 series, U.S.)
Column: PLGel-M, PLGel-L serial connection
Column temperature: 35° C.
Fluent: THF (tetrahydrofuran)
Flow rate: 1.0 mL/min
Concentration: ~1 mg/mL (100 μL injection)

2. Measurement Method of Polymer Conversion Rate

<Analysis Instrument>
Gas chromatography (PerkinElmer)
<Analysis Conditions>
Solvent: water
Initial temperature: 3 minutes at 50° C., ramp: 30° C./min at 200° C.
Injection volume: 0.5 μL
<Analysis Procedure>
After a reactant is diluted in a solvent to a concentration of 20 mg/mL and 5 mg/mL of acetone is added as a standard substance, the gas chromatography is measured. The conversion rate was measured according to the following equation.

$$\text{Conversion rate (\%)} = (A_{ini} - A_{fin})/A_{ini} \times 100 \quad \text{[Equation 1]}$$

In Equation 1 above, $A_{ini}$ is the area relative ratio of the monomer peak to the acetone peak at the initiation of the reaction, and $A_{fin}$ is the area relative ratio of the monomer peak relative to the acetone peak at the completion of the reaction.

3. Solubility Measurement Method

The solubility was evaluated by taking 1 g of the solubility measurement object (acrylic polymer), adding it to 5 g of a solvent (electrolyte or water), stirring it at room temperature (25° C.) for 30 minutes, and then removing undissolved residual solute. The amount of the solute dissolved in the solvent was measured by measuring the removed residual solute, and the solubility was evaluated by converting the measured amount into the value for 100 g of the solvent. Here, the removal of the residual solute was performed by filtering the solution out by a sieve with a pore size of about 0.45 μm or so.

The solubility was calculated as a percentage of the amount of the solute dissolved in the solvent based on the weight (solubility=100×B/(B+A)). Here, B is the weight (unit: g) of the solute and A is the weight (unit: g) of the solvent. Through this, the solubility of the acrylic polymer in the electrolytic solution or water was determined.

4. Adhesive Force Measurement

A specimen was prepared by stamping the prepared anode to a width of about 1.5 cm and a height of about 12 cm. Subsequently, a double-sided tape is attached on glass of a glass slide, a back surface of a 3M adhesive tape is attached on the double-sided tape, and the slurry surface of the stamped anode is attached on the adhesive tape to obtain a measurement sample. Thereafter, one end of the anode attached on the glass is peeled off about 0.5 cm and fixed to the lower clamp of a texture analyzer, and the other part of the drooping anode is fixed with the upper clamp, and then pulled with a force of about 2 gf to measure the force at the time when the anode slurry drops.

5. Maximum Particle Diameter Size Measurement

The maximum particle diameter size was measured using a plate on which micropores with different sizes ranging from 1 μm to 100 μm are formed. 1 g of the prepared slurry is taken and placed on the end of the portion having a large pore. The slurry was scratched from the 100 μm portion toward the portion pitted with a small pore using a plate rod and the maximum particle diameter size was determined by reading the pore size at the point where the slurry was no longer scratched.

Preparation Example 1. Preparation of Polymer (A1)

In a 100 mL round bottom flask, 1.8 g of acrylic acid (AA), 0.48 g of 2-hydroxyethyl acrylate (HEA), 0.12 g of acryloxyethyl phosphate (AEP) and 65 g of distilled water were placed and the inlet was sealed. The reaction was initiated by bubbling with nitrogen for 30 minutes to remove oxygen, placing the reaction flask in an oil bath heated to 65° C., and then introducing 2 mg of sodium persulfate and 0.23 mg of CTA (2-mercaptoethanol) thereto. The reaction was allowed to proceed for about 24 hours or so and then terminated to prepare a random polymer. The conversion rate calculated for the sum of the monomers AA, HEA and AEP applied in the above reaction was about 99% or so.

The ratio of AA units, HEA units and AEP units in the polymer was about 75:20:5 (AA:HEA:AEP) or so and the weight average molecular weight was about 1,250,000 or so (see Table 1 below).

Preparation Example 2. Preparation of Polymer (A2)

A random polymer was prepared in the same manner as in Preparation Example 1, except that 4-hydroxybutyl acrylate (HBA) was applied instead of 2-hydroxyethyl acrylate (HEA) as the hydroxyl group monomer unit. The conversion rate calculated for the sum of the monomers applied in the reaction was about 99% or so.

The ratio of AA units, HBA units and AFP units in the polymer was about 75:20:5 (AA:HBA:AEP) and the weight average molecular weight (Mw) was about 1,210,000 or so (see Table 1 below).

Preparation Example 3. Preparation of Polymer (A3)

A random polymer was prepared in the same manner as in Preparation Example 1, except that methacryloxyethyl phosphate (MAEP) was applied instead of acryloxyethyl phosphate (AEP) as the monomer unit having an unshared electron pair. The conversion rate calculated for the sum of the monomers applied in the reaction was about 99% or so.

The ratio of AA units, HEA units and MAEP units in the polymer was about 75:20:5 (AA:HEA:MAEP) and the weight average molecular weight (Mw) was about 670,000 or so (see Table 1 below).

Preparation Example 4. Preparation of Polymer (B1)

A random polymer was prepared in the same manner as in Preparation Example 1, except that the introduction amounts of the monomers were adjusted (AA: 1.32 g, HEA: 0.96 g, AEP: 0.12 g) so that the ratio of AA units, HEA units and AEP units in the polymer was about 40:55:5 (AA:HEA:AEP) or so.

The conversion rate calculated for the sum of the monomers applied in the reaction was about 99% or so and the weight average molecular weight (Mw) was about 725,000 or so (see Table 1 below).

Preparation Example 5. Preparation of Polymer (B2)

In a 100 mL round bottom flask, 1.92 g of acrylic acid (AA), 0.48 g of 2-hydroxyethyl acrylate (HEA) and 65 g of distilled water were placed and the inlet was sealed. The reaction was initiated by bubbling with nitrogen for 30 minutes to remove oxygen, placing the reaction flask in an oil bath heated to 65° C., and then introducing 2 mg of sodium persulfate and 0.23 mg of CTA (2-mercaptoethanol) thereto. The reaction was allowed to proceed for about 24 hours or so and then terminated to prepare a random polymer. The conversion rate calculated for the sum of the monomers AA and HEA applied in the above reaction was about 99% or so.

The ratio of AA units and HEA units in the polymer was about 80:20 (AA:HEA) or so and the weight average molecular weight was about 1,250,000 or so (see Table 1 below).

Preparation Example 6. Preparation of Polymer (B3)

A random polymer was prepared in the same manner as in Preparation Example 5, except that 4-hydroxybutyl acrylate (HBA) was applied instead of 2-hydroxyethyl acrylate (HEA) as the hydroxyl group monomer unit. The conversion rate calculated for the sum of the monomers applied in the reaction was about 99% or so.

The ratio of AA units and HBA units in the polymer was about 80:20 (AA:HBA) or so and the weight average molecular weight (Mw) was about 290,000 or so (see Table 1 below).

Preparation Example 7. Preparation of Polymer (B4)

In a 100 mL round bottom flask, 2.28 g of acrylic acid (AA), 0.12 g of acryloxyethyl phosphate (AEP) and 65 g of distilled water were placed and the inlet was sealed. The reaction was initiated by bubbling with nitrogen for 30 minutes to remove oxygen, placing the reaction flask in an oil bath heated to 65° C., and then introducing 2 mg of sodium persulfate and 0.23 mg of CTA (2-mercaptoethanol) thereto. The reaction was allowed to proceed for about 24 hours or so and then terminated to prepare a random polymer. The conversion rate calculated for the sum of the monomers AA and AEP applied in the above reaction was about 99% or so.

The ratio of AA units and ALP units in the polymer was about 95:5 (AA:AEP) or so and the weight average molecular weight was about 1,250,000 or so (see Table 1 below).

TABLE 1

| Classification | | | A1 | A2 | A3 | B1 | B2 | B3 | B4 |
|---|---|---|---|---|---|---|---|---|---|
| Content ratio of polymer | Carboxylic acid-containing monomer | AA | 75 | 75 | 75 | 40 | 80 | 80 | 95 |
| | Hydroxyl group-containing monomer | HEA | 20 | — | 70 | 55 | 20 | — | — |
| | | HBA | — | 20 | — | — | — | 20 | — |
| | Monomer having unshared electron pair | AEP | 5 | 5 | — | 17 | — | — | 17 |
| | | MAEP | — | — | 5 | — | — | — | — |
| Weight average molecular weight (Mw/$10^3$) | | | 1,250 | 1,210 | 670 | 725 | 1,250 | 290 | 1,250 |
| Polymer conversion rate (%) | | | 99% | 99% | 99% | 99% | 99% | 99% | 99% |

HEA: 2-hydroxyethyl acrylate;
HBA: 4-hydroxybutyl acrylate;
MAA: methacrylic acid;
AA: acrylic acid;
AEP: acryloxyethyl phosphate:
MAEP: methacryloxyethyl phosphate

EXAMPLE 1

After mixing the polymer mixture, the active material mixture and the conductive material (Super C) in a eight ratio of 4:95:1 (polymer mixture:active material mixture: conductive material), the anode slurry composition was prepared by adding water as a solvent so that the total solid content in the anode shiny composition was about 46 parts by weight relative to 100 parts by weight of the anode slurry composition.

Here, as the polymer mixture, a polymer mixture was used, in which the polymer (A1) (linear binder) prepared in Preparation Example 1 and the particulate binder (SBR) were mixed in a weight ratio of about 3:7 (A1:SBR), and the active material mixture was a known silicon series mixture, where an active material mixture was used, in which a carbon active material and a silicon active material were mixed in a weight ratio of about 90:10 (carbon active material:silicon active material).

Thereafter, the slurry was coated on a copper foil current collector with a thickness of about 20 μm so as to have a thickness of about 100 μm or so after drying, and vacuum dried at about 100° C. for about 10 hours to produce an anode having a loading amount of about 5.0 mAh/cm$^2$ or so.

EXAMPLE 2

An anode was produced in the same manner as in Example 1, except that the polymer (A2) (linear binder) prepared in Preparation Example 2 was used instead of the polymer (A1) (linear binder) prepared in Preparation Example 1.

EXAMPLE 3

An anode was produced in the same manner as in Example 1, except that the polymer (A3) (linear binder)

prepared in Preparation Example 3 was used instead of the polymer (A1) (linear binder) prepared in Preparation Example 1.

Comparative Example 1

An anode was produced in the same manner as in Example 1, except that the polymer (B1) (linear binder) prepared in Preparation Example 4 was used instead of the polymer (A1) (linear binder) prepared in Preparation Example 1.

Comparative Example 2

An anode was produced in the same manner as in Example 1, except that the polymer (B2) (linear binder) prepared in Preparation Example 5 was used instead of the polymer (A1) (linear binder) prepared in Preparation Example 1.

Comparative Example 3

An anode was produced in the same manner as in Example 1, except that the polymer (B3) (linear binder) prepared in Preparation Example 6 was used instead of the polymer (A1) (linear binder) prepared in Preparation Example 1.

Comparative Example 4

After mixing the polymer mixture, the active material mixture and the conductive material (Super C) in a weight ratio of 4:95:1 (polymer mixture:active material mixture: conductive material), the anode slurry composition was prepared by adding water as a solvent so that the total solid content in the anode slurry composition was about 46 parts by weight relative to 100 parts by weight of the anode slurry composition.

Here, as the polymer mixture, a polymer mixture was used, in which cyclomethyl cellulose (CMC) (linear binder) and the particulate binder (SBR) were mixed in a weight ratio of about 3:7 (CMC:SBR), and the active material mixture was a known silicon series mixture, where an active material mixture was used, in which a carbon active material and a silicon active material were mixed in a weight ratio of about 90:10 (carbon active material:silicon active material).

Thereafter, the shiny was coated on a copper foil current collector with a thickness of about 20 μm so as to have a thickness of about 100 μm or so after drying, and vacuum dried at about 100° C. for about 10 hours to produce an anode having a loading amount of about 5.0 mAh/cm² or so.

Comparative Example 5

An anode was produced in the same manner as in Example 1, except that the polymer (B4) (linear binder) prepared in Preparation Example 7 was used instead of the polymer (A1) (linear binder) prepared in Preparation Example 1.

Comparative Example 6

After mixing the polymer mixture, the active material mixture and the conductive material (Super C) in a weight ratio of 4:95:1 (polymer mixture:active material mixture: conductive material), the anode slurry composition was prepared by adding water as a solvent so that the total solid content in the anode slurry composition was about 46 parts by weight relative to 100 parts by weight of the anode slurry composition.

Here, as the polymer mixture, a polymer mixture was used, in which the polymer (A1) (linear binder) prepared in Preparation Example 1 and the particulate binder (SBR) were mixed in a weight ratio of about 5.5:4.5 (A1:SBR), and the active material mixture was a known silicon series mixture, where an active material mixture was used, in which a carbon active material and a silicon active material were mixed in a weight ratio of about 90:10 (carbon active material:silicon active material).

Thereafter, the slurry was coated on a copper foil current collector with a thickness of about 20 μm so as to have a thickness of about 100 μm or so after drying, and vacuum dried at about 100° C. for about 10 hours to produce an anode having a loading amount of about 5.0 mAh/cm² or so.

TABLE 2

|  | Example | | | Comparative Example | | | | | |
| --- | --- | --- | --- | --- | --- | --- | --- | --- | --- |
|  | 1 | 2 | 3 | 1 | 2 | 3 | 4 | 5 | 6 |
| Linear binder | A1 | A2 | A3 | B1 | B2 | B3 | CMC | B4 | A1 |
| Maximum particle diameter size of slurry (μm) | 65 | 58 | 77 | 80 | 87 | 55 | 88 | more than 100 | more than 100 |
| Adhesive force (gf/cm) | 18.79 | 12.12 | 15.41 | 9.51 | 3.81 | 2.5 | 10.39 | 3.22 | 10.1 |

As shown in [Table 2], when the polymers (linear binders) of Examples were each used as the anode slurry composition together with the particulate binder, it was confirmed that the dispersibility of the active material in the slurry was improved and the adhesive force to the current collector was high.

This is expected to be due to the feature of the polymer. For example, it is determined that this is because the unshared electron pairs contained in the polymer has been bound physicochemically to the component in the anode active layer and the current collector to increase the binding force between them. Also, it is determined that high compatibility of the polymers of Examples with the particulate binder prevents the phenomenon that the particulate binder floats to the surface upon drying of the anode and the adhesive force is reduced.

As a result, it can be confirmed that when the anode shiny composition of the present application is applied, there is an effect of increasing the dispersibility of the active material while maintaining the adhesive force in the silicon-based anode material, whereby excellent cycle characteristics and the like can be secured.

The invention claimed is:

1. An anode slurry composition, comprising:
an anode active material; and
an acrylic polymer,
wherein the acrylic polymer comprises, relative to 100 parts by weight of the acrylic polymer, 60 parts by weight to 90 parts by weight of a carboxylic acid-containing monomer unit, 5 parts by weight to 35 parts by weight of a hydroxyl group-containing monomer unit, and 1 part by weight to 10 parts by weight of a monomer unit having an unshared electron pair,
wherein the anode slurry composition has a maximum particle size of 55 μm or more and less than 80 μm, and
wherein the maximum particle size is determined by:
using a plate on which micropores with different sizes ranging from 1 μm to 100 μm are formed,
placing a sample of the anode slurry composition on an end of a 100 μm portion of the plate,
scratching the sample from the 100 μm portion toward a 1 μm portion, and
reading a pore size at a point where the sample is no longer scratched.

2. The anode slurry composition according to claim 1, wherein the carboxylic acid-containing monomer is (meth)acrylic acid, 2-(meth)acryloyloxyacetic acid, 3 (meth)acryloyloxypropylic acid, 4-(meth)acryloyloxybutyric acid, itaconic acid, maleic acid or maleic anhydride.

3. The anode slurry composition according to claim 1, wherein the hydroxyl group-containing monomer unit is a compound represented by the following Formula 1:

[Formula 1]

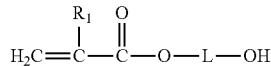

wherein, R1 is hydrogen or an alkyl group having 1 to 4 carbon atoms, and L represents alkylene with 1 to 10 carbon atoms un-substituted or substituted with an alkyl group having 1 to 4 carbon atoms or a hydroxyl group,

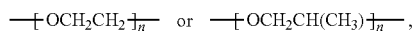

where n is an integer of 1 to 20.

4. The anode slurry composition according to claim 3, wherein the compound represented by Formula 1 is 2-hydroxyethyl (meth)acrylate, 2-hydroxypropyl (meth)acrylate, 4-hydroxybutyl (meth)acrylate, 6-hydroxyhexyl (meth)acrylate, 8-hydroxyoctyl (meth)acrylate, 2-hydroxyethylene glycol (meth)acrylate or 2-hydroxypropylene glycol (meth)acrylate.

5. The anode slurry composition according to claim 1, wherein the monomer unit having an unshared electron pair is a compound represented by the following Formula 2:

[Formula 2]

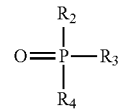

wherein, R2 to R4 are each independently a hydroxyl group or an ethylenic functional group, and at least one of R2 to R4 is the ethylenic functional group, where the ethylenic functional group is represented by —X—Y—Z, where X is an oxygen atom or a single bond, Y is a single bond, or alkylene with 1 to 4 carbon atoms un-substituted or substituted with an alkyl group having 1 to 10 carbon atoms or an aryl group having 4 to 12 ring members, and Z is a (meth)acrylate group, an allyl group or a vinyl group.

6. The anode slurry composition according to claim 5, wherein the compound represented by Formula 2 is (meth)acryloxyethyl phosphate, (meth)acryloxypropyl phosphate, monomethyl-2-methacryloyloxyethyl phosphate, dibutyl-2-methacryloyloxyethyl phosphate, dioctyl-2-methacryloyloxyethyl phosphate, diphenyl-2-methacryloyloxyethyl phosphate, allyl phosphate, vinyl phosphate, bis (methacryloxyethyl) phosphate, allyl phosphoric acid or vinyl phosphoric acid.

7. The anode slurry composition according to claim 1, wherein the acrylic polymer has a solubility of 5% or less in a non-aqueous solvent at room temperature and a solubility of 50% or more in water at room temperature, and wherein the non-aqueous solvent is selected from the group consisting of a carbonate-based, ester-based, ether-based, ketone-based, alcohol-based or aprotic solvent.

8. The anode slurry composition according to claim 1, wherein the acrylic polymer has a glass transition temperature in a range of −100° C. to 200° C.

9. The anode slurry composition according to claim 1, wherein the acrylic polymer has a weight average molecular weight in a range of 50,000 to 5,000,000.

10. The anode slurry composition according to claim 1, wherein the anode active material comprises at least a silicon active material.

11. The anode slurry composition according to claim 1, further comprising a particulate binder.

12. The anode slurry composition according to claim 11, wherein the particulate binder is present in a range of 100 parts by weight to 900 parts by weight relative to 100 parts by weight of the acrylic polymer.

13. An anode comprising:
a current collector; and
an anode active layer which is formed on at least one side of the current collector and is a dried product of the slurry composition of claim 1.

14. An anode comprising:
a current collector; and
an anode active layer which is formed on at least one side of the current collector and is a dried product of the slurry composition of claim 1.

15. A secondary battery comprising the anode of claim 13.

16. The anode slurry composition according to claim 1, wherein the acrylic polymer has a molecular weight distribution ranging from about 2 to about 10.

* * * * *